Patented May 29, 1934

1,961,031

UNITED STATES PATENT OFFICE 1,961,031

POLISH COMPOSITION

Leonard Bevis, Warsaw, Ky.

No Drawing. Application May 18, 1931,
Serial No. 538,397

2 Claims. (Cl. 134—24)

This invention relates to an improvement in polish compositions for polishing and renewing the finishes of automobiles, furniture, and woodwork and the like, and particularly to a vegetable base polish having the features of superiority and novelty set out more fully below.

An object of my invention is to provide an improved polish, adapted for use on automobiles, furniture, and all woodwork surfaces, which takes a less amount, and is therefore more economical; which does not injure any kind of finish but which will preserve and build up the finish, and does not require hard rubbing to produce lustre.

Another object of my invention is to provide a polish which contains less oil and grease than those generally appearing on the market, which show a smokey and cloudy appearance after standing a few days, and which produces and maintains a high lustre and clarity after polishing and does not become sticky or smeary since the base contains more vegetable matter than other polishes, and which will withstand the injurious effects of rain, snow and other water or conditions.

Another object of the invention is to produce a polish in which there is absolutely no danger of spontaneous combustion after use on cloths or waste or when around flames.

These and other objects of the invention, its nature, and its composition and arrangement and combination of parts, and the nature and quantity of ingredients, and the manner of assembling the same, will be readily understood by anyone acquainted with the art to which this invention relates upon consulting the following descriptions.

The composition of the invention comprises a combination of ingredients, which can be varied quite substantially without destroying the quality of the polish.

In describing the making of my improved polish, a quantity of about one and one-half (1½) gallons will be considered, and I prefer to use the following ingredients in the order stated below:—

Take 2 ounces of gloss starch, mix with about a gill of cold water to dissolve starch; then pour into a pint of boiling water, then stir and let cool. Take one-fourth (¼) ounce powdered slippery elm in a separate vessel, add one pint of water and cook to a boil. Let cool. Mix the starch and elm mixture together and stir thoroughly. Add to this the whites of eight (8) eggs, and stir well. To this add one quart of liquid soap, made by dissolving 4 ounces Ivory soap in about ¾ quart of boiling water and stir thoroughly to amalgamate the different ingredients thus far brought together. Then strain through a sieve in order to get a smooth opalescent paste, which forms the base of the polish. Then add the following ingredients in order, stirring as each one is added: Add three (3) pints of light rubbing oil (which is a mineral oil), one quart of turpentine. To this add one quart of denatured alcohol and one pint of acid vinegar.

In applying this polish, the container should be shaken before using because of the difference in the specific gravity of the ingredients. All surfaces should be cleaned before applying the polish. The polish can be applied by moistening a soft rag or cotton waste and applying thinly, covering all the surface. Then wipe thoroughly dry with a dry cloth or waste.

While describing this polish in its preferred form, it is understood that some of the ingredients can be substituted, such as oil. Any light mineral oil will serve, and wood alcohol and cider vinegar will serve. Or the vinegar may be omitted.

The object in view is to provide a polish with a vegetable base, such as I describe. The starch when heated forms an opalescent paste and is a gelatinous colloid. The slippery elm, when cooked, makes a slimy mucous mass, and contains mucilage. The egg whites (albumen) and the starch gives lustre and clarity. The slippery elm mixed with these ingredients binds them together into a heavy paste. As these first three ingredients are not soluble in alcohol, liquid soap is added which contains vegetable oils and oil fats to bring them to the state in which alcohol can be used for preserving purposes and for drying.

The rubbing oil (mineral oil) is used to give smoothness to the liquid when applied. It also helps to preserve it. Turpentine is used for drying and quick cutting. The acid vinegar used for quick cutting and cleaning. When these ingredients are combined in the making of the polish as described, they produce the result intended.

Therefore it is to be definitely understood that I do not desire to limit the application of this invention to the particular modification set out herein and to illustrate the principles thereof, and any change or changes may be made in ingredients, and in the steps and operations involved in assembling the same, within the spirit and scope of the invention.

What is claimed is:—

1. A process of making a polishing composition consisting in making an aqueous paste of starch and water, adding thereto a quantity of boiling water and stirring then cooling the same; then cooking to a boil in water some slippery elm and cooling the same; then mixing the starch paste and elm; then adding to this a quantity of the whites of eggs and stirring; then adding thereto a quantity of liquefied soap and straining the resultant; then adding thereto and stirring as each is added the following in the order named: some light mineral oil, some turpentine, some alcohol.

2. A process of making a polishing composition consisting in making an aqueous paste of starch and water, adding thereto a quantity of boiling water and stirring then cooling the same; then cooking to a boil in water some slippery elm and cooling the same; then mixing the starch paste and elm; then adding to this a quantity of the whites of eggs and stirring; then adding thereto a quantity of liquefied soap and straining the resultant; then adding thereto and stirring as each is added the following in the order named: some light mineral oil, some turpentine, some alcohol, and a vinegar.

LEONARD BEVIS.